Sept. 3, 1940. O. BAILER 2,213,512
RECORD, ANIMATED-OBJECT, AND REPRODUCTION CONTROL SYSTEM
Filed March 7, 1939 2 Sheets-Sheet 1
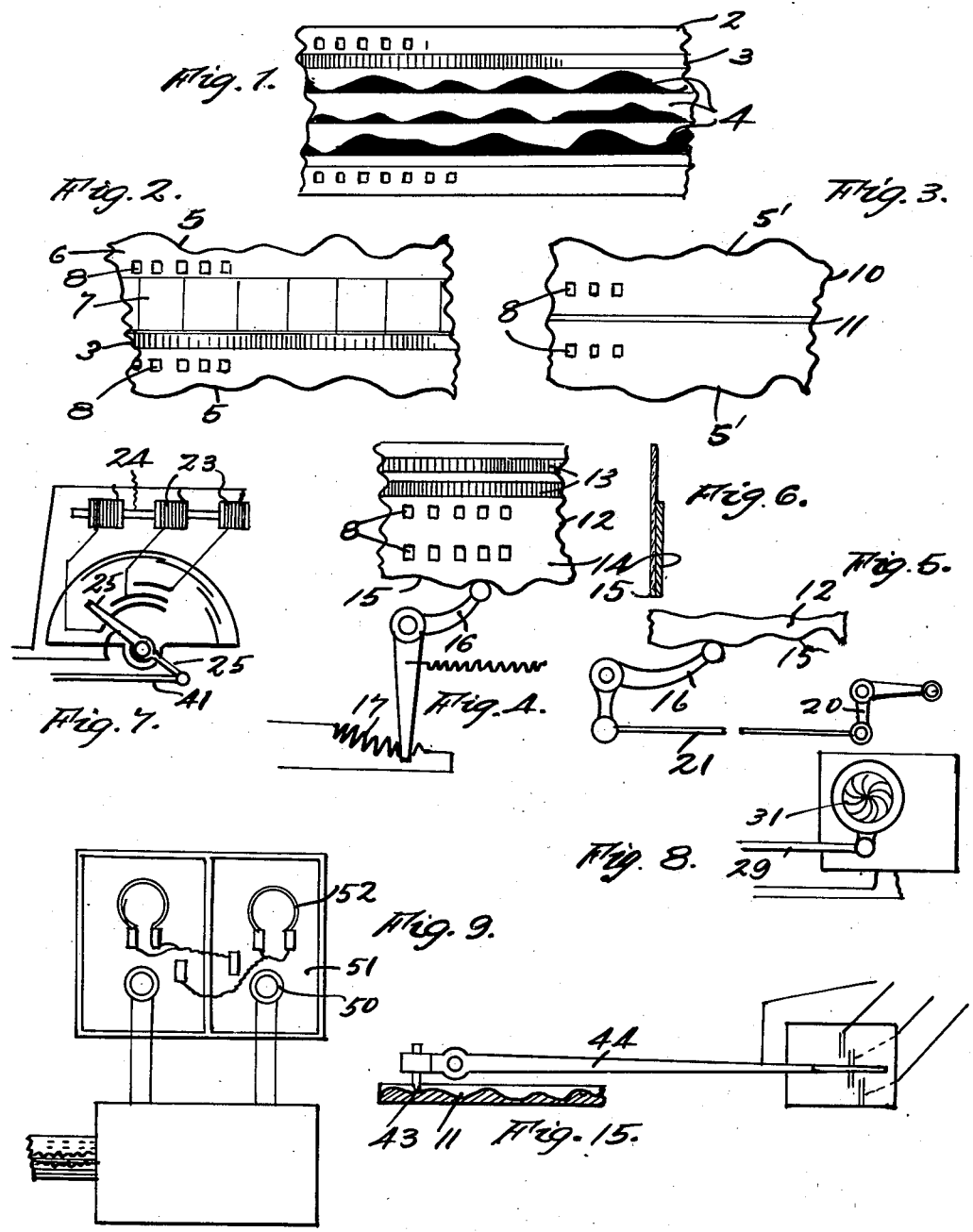
Inventor,
Otto Bailer;
By his Atty,
Frederick E. Maynard

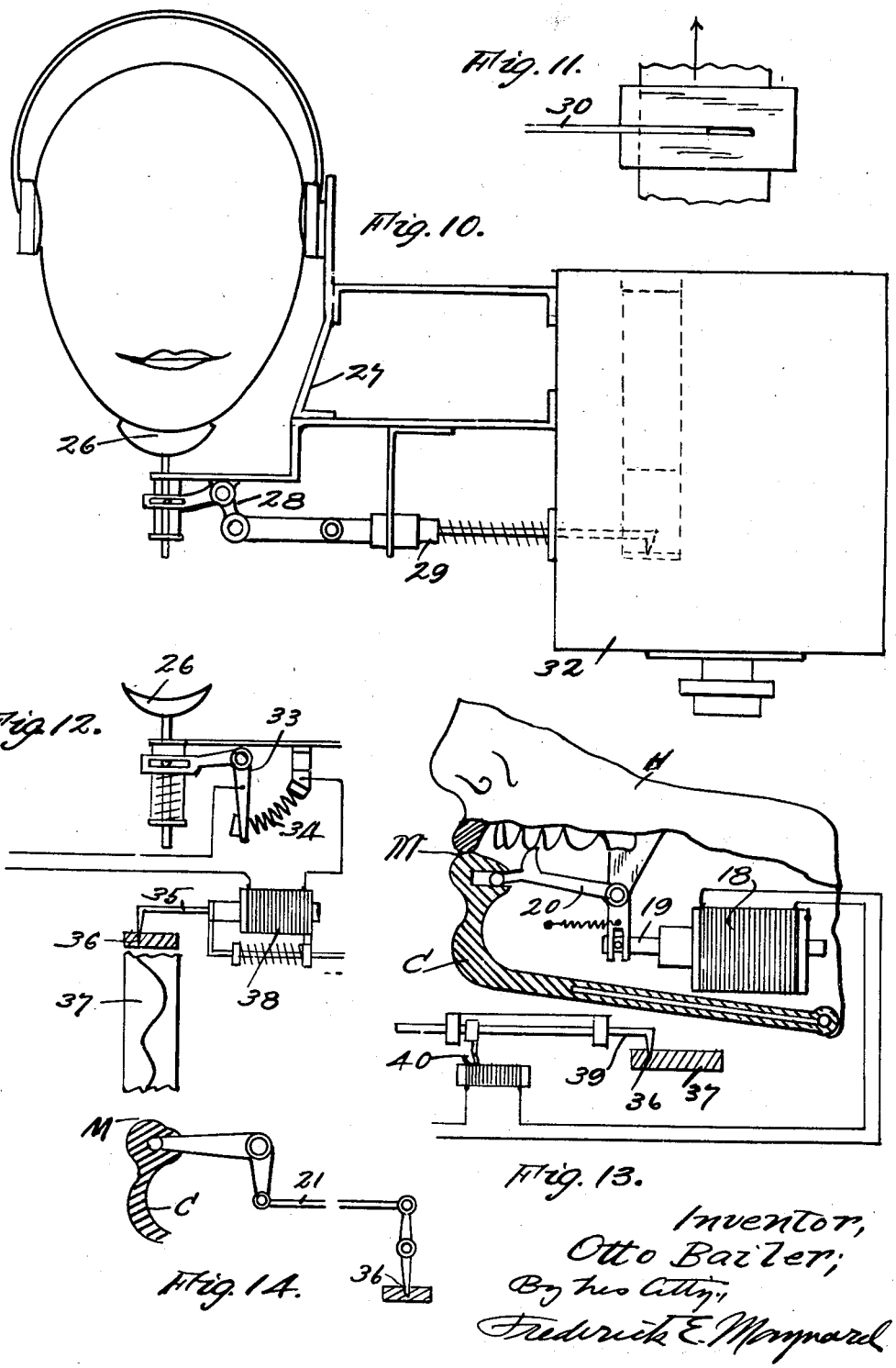

Patented Sept. 3, 1940

2,213,512

UNITED STATES PATENT OFFICE 2,213,512

RECORD, ANIMATED-OBJECT, AND REPRODUCTION CONTROL SYSTEM

Otto Bailer, Los Angeles, Calif.

Application March 7, 1939, Serial No. 260,440

11 Claims. (Cl. 46—119)

This invention is a record controlled animated object and sound reproduction control system, and is an improvement in the original system set forth in U. S. patent application Serial No. 216,946, filed July 1, 1938.

It is an object of the present invention to provide an animated object such for instance as the human head and face in combination with means, controlled by a suitable record, whereby the chin and mouth of the object, or figure as it will be hereafter called, will be automatically opened and closed in a carefully controlled manner to simulate motions of the mouth and chin in speaking or singing, or laughing. In this connection it is an object to provide a dummy figure the face or all frontal-view parts of which are of flexible, or if preferred of elastic material. By this latter provision it is the intent of this invention to provide for the lateral elongation of the lips of the mouth of the dummy figure as in smiling, without opening the lips, and in conjunction with such opening motion, if desired, or vice versa.

It has been proposed heretofore to animate the lower jaw of a dummy figure by the simple expedient of exciting an electro-magnet by electric current in indifferent impulse flows without regard to the true simulation of mouth motions as determined by the spoken or sung words, and the consequence of such indefinite impulses was to merely cause the dummy mouth to ridiculously vibrate without controlled degree of mouth movement. An important function of the instant invention is to provide a definite master control means and a thereby controlled mechanism or figure to effect the correct degree of movement of any part of the mechanism or figure in simulation of the actions of an original subject.

A further intent of the invention is to provide a method and means for the effective recordation of any desired source of motivating energy; for instance the recordation of sound waves by mechanical, or electrical or photographic means, or the recordation of air waves by such means, or of light waves or other recordable wave energy media, or for the transmittable recordation of any desired mechanical motion whether of animal or any other source, either with or without the concurrent recordation of two or more desired effective source media, as of sound, motion or other nature, all with the purpose in view of the effective transmission and subsequent reproduction by suitable means either electrically, mechanically or photographically, or any suitable combination of such instrumentalities, as will be shown later herein. A purpose of the invention is to provide for the coordinated, synchronized and correct degree functioning of a reproducing agent to effectively simulate sounds and motions or other sensible source phenomena of an untold variety or combinations.

The invention consists of certain advancements in this art as set forth in the ensuing disclosure and having, with the above, additional objects and advantages as hereinafter developed, and whose constructions, combinations and details of means, and the method, and the manner of operation will be made manifest in the description of the herewith illustrative embodiments; it being understood that modifications, variations and adaptations may be resorted to within the scope, principle and spirit of the invention as it is more directly claimed hereinbelow. It is understood that the functional use of the apparatus of this disclosure in any other art than that here exhibited is deemed to be within the range of this invention, as set out here in whole or in part.

Figures 1, 2 and 3 are plans of fragments of different forms of record strips, suitably produced from master means, showing variant types of sound, picture and motion records in divers combination.

Figure 4 is a plan of one form of record strip and a mechanism for controlling the operation of an electrical type of reproducing apparatus, under control of the strip record.

Figure 5 is a plan of one form of record strip and a mechanism for direct operative combination with a part of a reproducing apparatus, such as the chin of a dummy figure.

Figure 6 is a cross-section of a form of record strip including translucent photographic record, such as the conventional sound record and a mechanical, trolley operating record element.

Figure 7 is a schematic plan of a means for controlling excitation of a plurality of electromagnetic devices useful in the reproducing apparatus.

Figure 8 is a view of a subject operative means to actuate a lens shutter for the making of a photographic record of a subject motion, such as a chin movement in speaking.

Figure 9 is a schematic plan of a record making station for making a conventional, or other film strip record both of the face motion and the voice record of part speakers, whereby to make clear individual records of the spoken parts of each speaker as well as to produce a clear record of the chin motion of each for properly coordinated sound and face motion reproduction, as for instance by a ventriloquist, impersonated by a dummy, and his dummy figure.

Figure 10 is a schematic elevation of a recording apparatus for direct operation by a speaking subject whereby to produce a record of the movement of the chin or other part of the face, or of the head, or any suitable combination of these movements; each different part of the head or the head to have its own separate record.

Figure 11 is a plan of a speaking-controlled device for operation of one form of light shutter of a camera for making a photographic record of the subject chin or other head part, or head motion.

Figure 12 is an elevation of a speaker-motion controlled device for operation of an electrical recorder to make a record of a speaker-part motion, as of the chin; a part of the record being shown flexed to a right angle and sectioned.

Figure 13 is a sectional elevation of an electrically operated chin of a dummy figure.

Figure 14 is a sectional detail of a mechanical means directly operating the chin.

Figure 15 is a modified form of electromechanical reproducer controlled by an undulating depth record track for a variable degree of dummy part action.

In Fig. 1 there is shown a reproducing record strip, of motion picture type, having a conventional photographic sound record 3 along the strip 2, and one or more light controlling, elongate records 4 of similar operative function but of different value as for the control of action of say the chin C, of a dummy figure head H, the rotation of the head, and the rolling of the eyes or the lateral stretch of the mouth of the dummy, which mouth is preferably made of flexible or of elastic material so that mouth motions of a speaker or singer may be closely simulated by the dummy.

Fig. 2 shows a form of the record track as embodied in one or more undulating edges 5 of the strip 6, which in this form has a sound track 3 and a series of picture frames 7 pertinent to the other record tracks. In this case the strip 6 has rows of sprocket apertures 8—8 inwardly of the track edges 5.

Fig. 3 depicts a form of opaque strip 10 with motion-controlling edges 5'; feed sprocket holes 8—8 and in this case a mechanical or phonograph stylus record track 11.

Fig. 4 illustrates a record strip 12 having a translucent zone with a plurality of photographic sound tracks 13 for reproduction in the usual manner and the strip includes a thickened margin 14 which may be opaque and is provided with feed perforations 8—8. This thickened side of the strip is provided with an undulating, motion-controlling record track 15. The thickened zone 14 may be produced on the strip 12 as an applied layer of metal or other desired material. For reproducing from the motion tracks, as made by the undulating edge type seen in Figs. 2, 3, 4 and 5, there is provided a trolley lever 16 which in Fig. 4 is made to oscillate on a rheostat 17 whereby to regulate the amount of electric current which may be passed to a solenoid 18, Fig. 13, of the dummy head.

The armature 19 of this solenoid connects to a lever 20 suitably joined to the lower lip of the mouth M. A deep valley in the motion track 15, Fig. 4, will so move the trolley lever that a strong current will flow from the rheostat 17 to the solenoid and the chin will be forced down to simulate a like movement of the speaker's chin when uttering sounds or words—such as the word "How," whether spoken loudly or softly. One of the motion-control tracks, as 5, Fig. 2, may be used to operate a like solenoid to draw the ends of the mouth M endwise as when speaking the word "See"; when the lips are flexible or elastic. One of the motion-control tracks, of the three in Fig. 1, may be likewise employed to effect action of turning the head H, or of rolling its eyes, not here shown. It is understood that the motion-control track or tracks may be employed for the animation of any desired apparatus and parts thereof by adaptation.

In Fig. 5 there is shown a direct link means or device 21 connecting the trolley lever 16, operated by a track 15, to the chin or mouth lever 20.

Owing to the relatively slow speed of movement of any part of a speaker's head a mechanical take-off or reproducing mechanism can be practically operated by a motion-track which is copied from a master which itself is produced by action of say the chin through any desired means, as will be described.

In Fig. 7 there is shown a plurality of magnet devices 23 affecting a common armature or core 24, in succession as each is successively energized by a track-controlled switch 25 as by lever 16 or otherwise, noted herebelow.

A motion-record making means is shown in Fig. 10 as including a chin pad 26, in a suitable bearing or head set-frame 27, connected to and operating a lever 28 of a stylus bar 29, or to a light controlling shutter 30, Fig. 11, whereby in either case to make a mechanical track record or a photographic record, the latter is seen at 4, in Fig. 1. The chin actuated bar 29 is shown in Fig. 8 as operative on an iris type shutter 31 to produce a translucent light record as in the art of sound record by light means.

The record making bar 29 may be used in combination with any well known form of motion picture and sound record camera box 32, or the incidental sound and picture of a given subject may be made in a separate apparatus and on a separate track strip.

The chin pad 26 is shown in Fig. 12 as controlling the arm 33 of a solenoid controlling rheostat 34 to effect the sinuous movement of a cutting stylus 35 on a track 36 along the strip 37 in accordance with the variant pull of the stylus by the solenoid 38. Figure 13 shows this track 36 used to oscillate a reproducer stylus 39 to motivate a rheostat switch 40 for regulation of current to the magnet 18 for controlled degree of movement of the chin and mouth lip; the magnet moving its armature 19 and its chin lever 20 in amounts as determined by the strength of the current from the rheostat 40 (controlled by the record track 37).

Instead of the electrical reproducer, the track 36 may be used to actuate a mechanical connector 21, above mentioned, to simulatingly move the chin, or any other element of given equipment; as seen in Fig. 14.

While a variable power current may be sent to the magnet 18 through its rheostat device 40, a uniform current may be sent to each of the train of magnets 23, Fig. 7, by use of a mechanical form of track to shift a stylus rod 41 to throw the switch 25 so that the actuating core 24 will be moved to a controlled degree.

The motion-control track 11, Fig. 3, is straight and of undulating depth and may be produced by the device shown in Fig. 15, wherein a stylus 43 oscillates a lever 44 and this may be used either for a rheostat switch or for the switch arm 25, of Fig. 7.

When it is desired to produce motion-record tracks with sound records of a plurality of individuals either on one strip or separate strips, the motion-record of each speaker may be produced by sound apparatus by way of a microphone 50 for each party installed in a respective isolated room 51, Fig. 9. To enable the parties to carry on the dialogue each is provided with a telephonic head-set 52 so that responses received by each will not be picked up by the microphones and transmitted to the sound track which is to be used for reproduction of face motions by suitable means, as for instance by employment of a photoelectric cell to control current to suitable figure-part operating circuits.

What is claimed is:

1. The combination of a record strip having a track characterized by predetermined variations indicative of the different degrees of motion of a part of a speaker's or singer's face, and a reproducing apparatus including a dummy figure part simulating said face part and means controlled by said record track to animate the dummy part to simulate the original various motions.

2. In apparatus of the class described, a mechanical device to be animated in part or in full, a record element having a track characterized by predetermined variations indicative of the different degrees of motion or motions of a master subject part or parts, and means controlled by said record track for animating a relative part of the said device to simulate the same degree of movements by the corresponding part of the master subject.

3. A motion reproducing system having, in combination; a record strip for effecting and controlling a simulating movement in predetermined degrees of a relative part of an animative device of the system and which record has a track which is characterized by variations indicative of the various degrees of motion of a given part of a master subject.

4. In a motion reproducing system, an animative mechanical device, a record strip, and means for making a track record thereon characterized by the varying degree of movement of a given part of a master subject; said track operative to control the movement in corresponding degrees of the corresponding part of said animative mechanical device.

5. In a motion reproducing system, a record element, a subject controlled means for producing a record track on the element in accordance with the variations of movement of a part of the subject, an animative device including a corresponding part, and reproducing means controlled by the track record to effect predetermined degrees of movement of the device part.

6. A system as in claim 5, and in which the reproducing means includes a mechanical instrument directly operative on said corresponding device part.

7. A system as in claim 5, and in which the reproducing means includes an electrical actuator operative on said device part.

8. A system as in claim 5, and in which the subject controlled means includes a mechanical light shutter directly controlled by a given subject part.

9. A system as in claim 5, and in which the reproducing means includes an electrical instrument for motivating the animated part and having a magnet actuated element and a means controlled by the record to undulate a current to the magnet.

10. A system as in claim 5, and in which the reproducing means includes a mechanical connection between the controlling track and the part to be animated, the record having a track engaging and reciprocating a member included in said connection.

11. In a motion reproducing system, an animative dummy figure having a face-imitation portion including a mouth and which portion is flexible to enable the mouth to be opened vertically or to be drawn sidewise to simulate a smile action, and including a record element, subject controlled means to produce a track on the element characterized by motions of various degrees of the mouth of the subject in simulative degree, and means controlled by the track to effect corresponding degrees of motion of the dummy mouth.

OTTO BAILER.